(12) United States Patent
Schultz et al.

(10) Patent No.: US 10,003,627 B2
(45) Date of Patent: Jun. 19, 2018

(54) METHOD, DEVICE AND SYSTEM FOR MANAGING AUDIO, VIDEO AND DATA COMMUNICATIONS

(71) Applicant: Nurep, Inc., San Jose, CA (US)

(72) Inventors: David Paul Schultz, Los Gatos, CA (US); Adam Daniel John, San Francisco, CA (US); Nicholas Ralph Damiano, San Francisco, CA (US); Sainath Shenoy, Fremont, CA (US)

(73) Assignee: NUREP, INC., San Jose, CA (US)

( * ) Notice: Subject to any disclaimer, the term of this patent is extended or adjusted under 35 U.S.C. 154(b) by 63 days.

(21) Appl. No.: 14/336,403

(22) Filed: Jul. 21, 2014

(65) Prior Publication Data

US 2016/0182596 A1 Jun. 23, 2016
US 2016/0323350 A9 Nov. 3, 2016

Related U.S. Application Data

(60) Provisional application No. 61/858,068, filed on Jul. 24, 2013.

(51) Int. Cl.
*G06F 15/16* (2006.01)
*H04L 29/06* (2006.01)
*H04L 29/08* (2006.01)
*H04W 76/02* (2009.01)
*H04W 8/00* (2009.01)

(52) U.S. Cl.
CPC ............ *H04L 65/608* (2013.01); *H04L 67/12* (2013.01); *H04L 67/141* (2013.01); *H04L 67/18* (2013.01); *H04L 67/303* (2013.01); *H04W 76/023* (2013.01); *H04W 8/005* (2013.01)

(58) Field of Classification Search
CPC ......... H04L 67/00; H04L 67/22; H04L 67/24; H04L 67/65; H04W 4/00; H04W 4/005; H04W 4/02; H04W 64/00; H04W 68/00
See application file for complete search history.

(56) References Cited

U.S. PATENT DOCUMENTS

| 8,588,754 | B2 * | 11/2013 | Gisby | H04M 3/5158 455/410 |
|---|---|---|---|---|
| 2003/0220835 | A1 * | 11/2003 | Barnes, Jr. | G06Q 10/1053 705/14.36 |
| 2008/0004038 | A1 * | 1/2008 | Dunko | H04W 4/08 455/456.1 |
| 2008/0189360 | A1 * | 8/2008 | Kiley | G06F 17/30867 709/203 |
| 2013/0198281 | A1 * | 8/2013 | Scuba | H04L 67/18 709/204 |

* cited by examiner

*Primary Examiner* — Chirag R Patel
*Assistant Examiner* — Rachel J Hackenberg
(74) *Attorney, Agent, or Firm* — J. Curtis Edmondson; Law Offices of J. Curtis Edmondson

(57) ABSTRACT

Described herein are methods, systems and programs for managing the sharing of video, audio and data communications between users over the internet in the most efficient manner. The video, audio and data communications secured by means of advanced encryption standard (AES) like in the form of 128-bit or other encryption standard and efficiently communicated across a Web Real-Time Communication (WebRTC) protocol.

16 Claims, 4 Drawing Sheets

METHOD, DEVICE AND SYSTEM FOR MANAGING AUDIO, VIDEO AND DATA COMMUNICATIONS

CROSS REFERENCE TO RELATED APPLICATION

This application claims priority to U.S. provisional patent application Ser. No. 61/858,068 filed Jul. 24, 2013, the entire content of which is incorporated herein by this reference.

SCOPE

The present inventive subject matter relates to the managing of communications between electronic devices, and more particularly to managing connections between electronic devices.

BACKGROUND

Many industries have complex products that require services such as continuous maintenance, customer support, education, training and certification. Typically, companies within these industries provide these services through methods such as in-person, phone, e-mail, SMS and video.

In addition, in certain instances, the request for these services is mission critical in which an imminent response is required as quickly as possible. An example can be an operating room staff requiring support from a medical supplier during a procedure as a result of a malfunction or error in which timeliness of the response can impact patient outcomes.

In these instances, in-person support is not possible due to travel and time constraints. Furthermore, phone, email or SMS are insufficient, inefficient and may not adequately address the issue.

As a result, live video support is required in order to provide the support required. However, current methods to connect the users are inefficient. They rely on either connecting two individuals in a peer-to-peer fashion directly, or submission of a request requiring the user to initiate a call to the other user. There is no solution on the market today that provides on-demand connection between users electronic devices over the internet to provide live real-time video, audio and data communications.

BRIEF SUMMARY

Described herein are methods, systems and program products for managing video, audio and data communications through a number of defined parameters in the most efficient manner. The inventive subject matter discloses a novel way to connect users electronic devices over the Internet using a variety of parameters in the most efficient manner to collaborate and share video, audio and data. This in turn helps in connecting suppliers of medical device-related products to providers of healthcare services in a remote fashion. An example is a healthcare professional obtaining support from a remote medical device representative during a procedure in the operating room. The video, audio and data may be secured by means of advanced encryption standard (AES) and may be in the form of 128-bit or other encryption standard and may be communicated across a Web Real-Time Communication (WebRTC) protocol.

DETAILED DESCRIPTION

Figure 1:
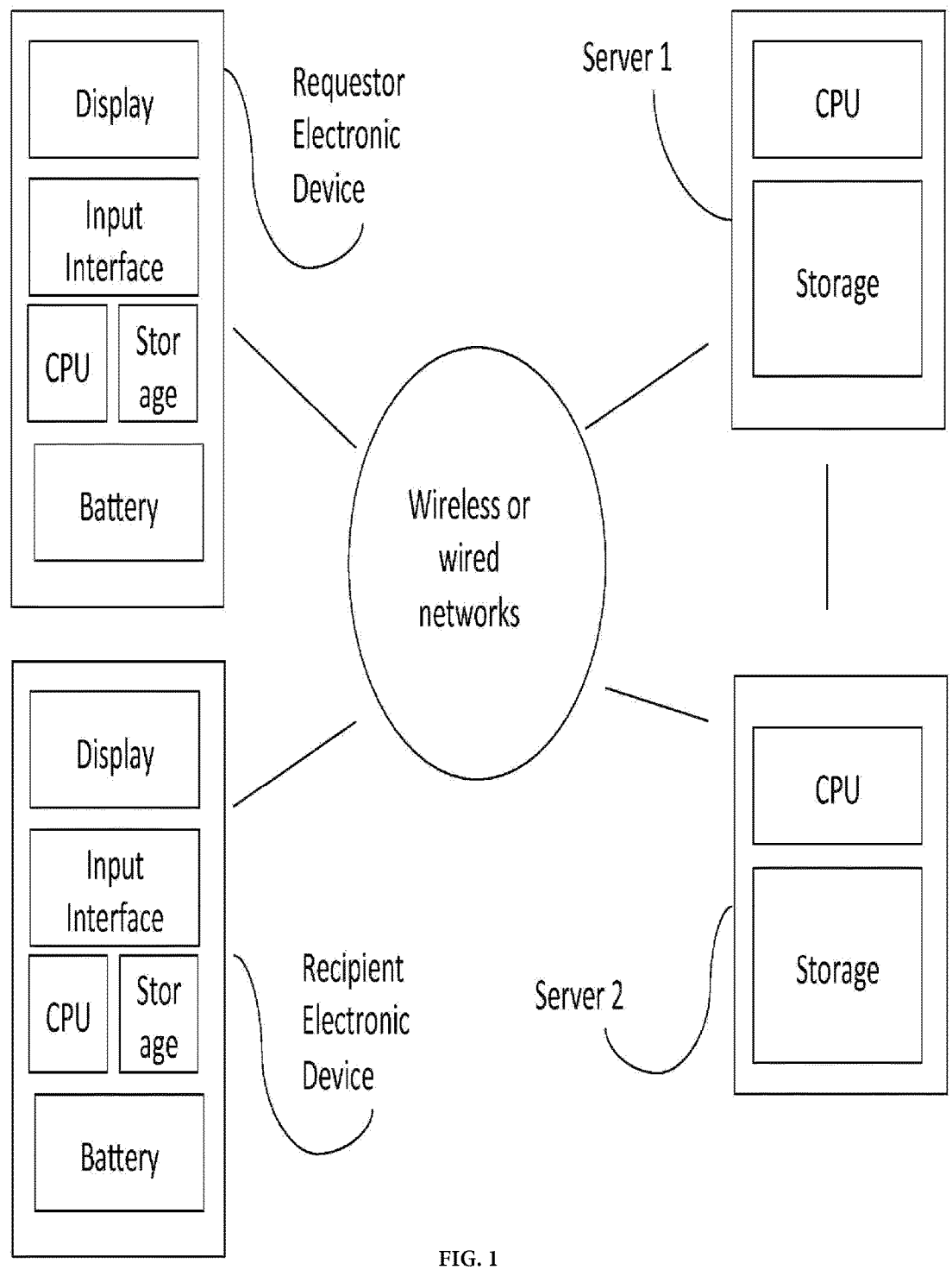
FIG. 1 is a schematic view of computer networking environment involving the requestor and recipients electronic device.

FIG. 1 illustrates a computer networking environment or system according to an embodiment of the inventive subject matter. The system can include one or more electronic devices, for example one electronic device of a requestor and an electronics device for each of one or more recipients. For simplicity, only one recipient electronic device is shown in FIG. 1, although it is appreciated that a plurality of recipients and a respective plurality of recipient electronic devices can be provided. Each of the plurality of electronic devices, such as the requestor electronic device and the recipient electronic device illustrated in FIG. 1, may comprise a computing device, including but not limited to a modem, a router, a gateway, a server, a thin client, a laptop, a desktop, a computer, a tablet, a media device, a smart phone, a cellular phone or other mobile device, or any combination or sub-combination of the same.

The term electronic device as used herein is intended to be broadly interpreted, and can include at least one electronic device that can accept, process, store (at least temporarily), and output data according to programmed instructions. Thus, an electronic device can include, by way of example and not by way of limitation, a computer, laptop computer, tablet, mainframe computer, cell phone, smart phone, personal digital assistant, and processor-based controller on a machine. Each of the plurality of electronic devices may include a memory or storage encoded with executable instructions that may operate in conjunction with one or more processing units or CPUs of the electronic device. The one or more processing units may provide functionality allowing execution of executable instructions encoded on the memory of the electronic device. Each electronic device can include one or more displays and can include one or more input interfaces, which can include the display, a keyboard, a mouse and any other input device known in the art, now or in the future. Each electronic device can include a battery for providing power to the device, and each electronic device may include instructions for execution of one or more applications. Each of the one or more applications may comprise any application known in the art, now or in the future, and may be executed in any operating environment or system.

The system of the inventive subject matter can further include one or more servers, for example server 1 and server 2 in FIG. 1. Each server can include one or more processing units or CPU as well as a memory or storage encoded with executable instructions that may operate in conjunction with one or more processing units or CPUs. Where a plurality of servers is provided, the servers can be electrically coupled together or otherwise communicate with each other.

Each electronic device and each server may be configured to communicate over one or more networks with any number of devices or servers, including but not limited to the other components of the computer networking environment described or illustrated herein. The network may comprise one or more networks, such as local area networks (LANs), wide area networks (WANs), metropolitan area networks (MANs), cellular networks, and/or the Internet. Communications provided to, from, and within the network may wired and/or wireless, and further may be provided by any networking devices known in the art, now or in the future. Devices or servers communicating over the network may communicate with any communication protocol, including TCP/IP and UDP protocols. Moreover, the electronic devices and servers may be configured to communicate using protocols such as HTTP, HTTPS, SSL, or any protocol derived therefrom. In addition, communication may be configured over web real time communication (WebRTC) protocol in which no server or plug-in is required and each electronic device can communicate with each other in a peer-to-peer fashion.

Figure 2:
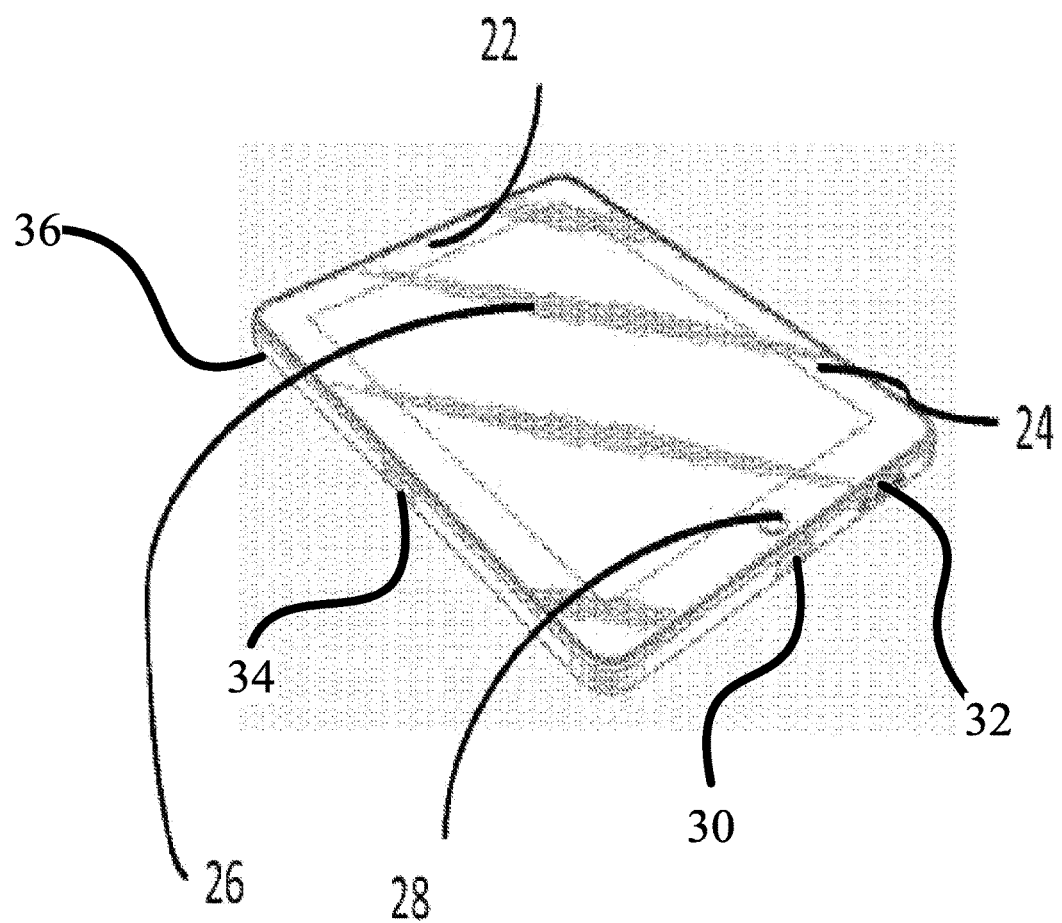
FIG. 2 is a schematic view of one embodiment of a mobile tablet computer for use with the system of FIG. 1.

In one embodiment, one or both of the electronic devices is a mobile device such as a tablet computer. FIG. 2 is a schematic view of one embodiment of a mobile tablet computer that can be utilized. Mobile tablet computer contains a shell 24, screen 26, front-facing camera 22, navigation 28, rear-facing camera 36, power supply 30, audio speakers 32, and audio controls 34. Said embodiment is housed in a software application within the mobile tablet computer and may communicate with one or more servers, as shown in FIG. 1 or as described in FIG. 5. It is appreciated that the software application may be stored on any electronic device connected to the Internet.

Figure 3:
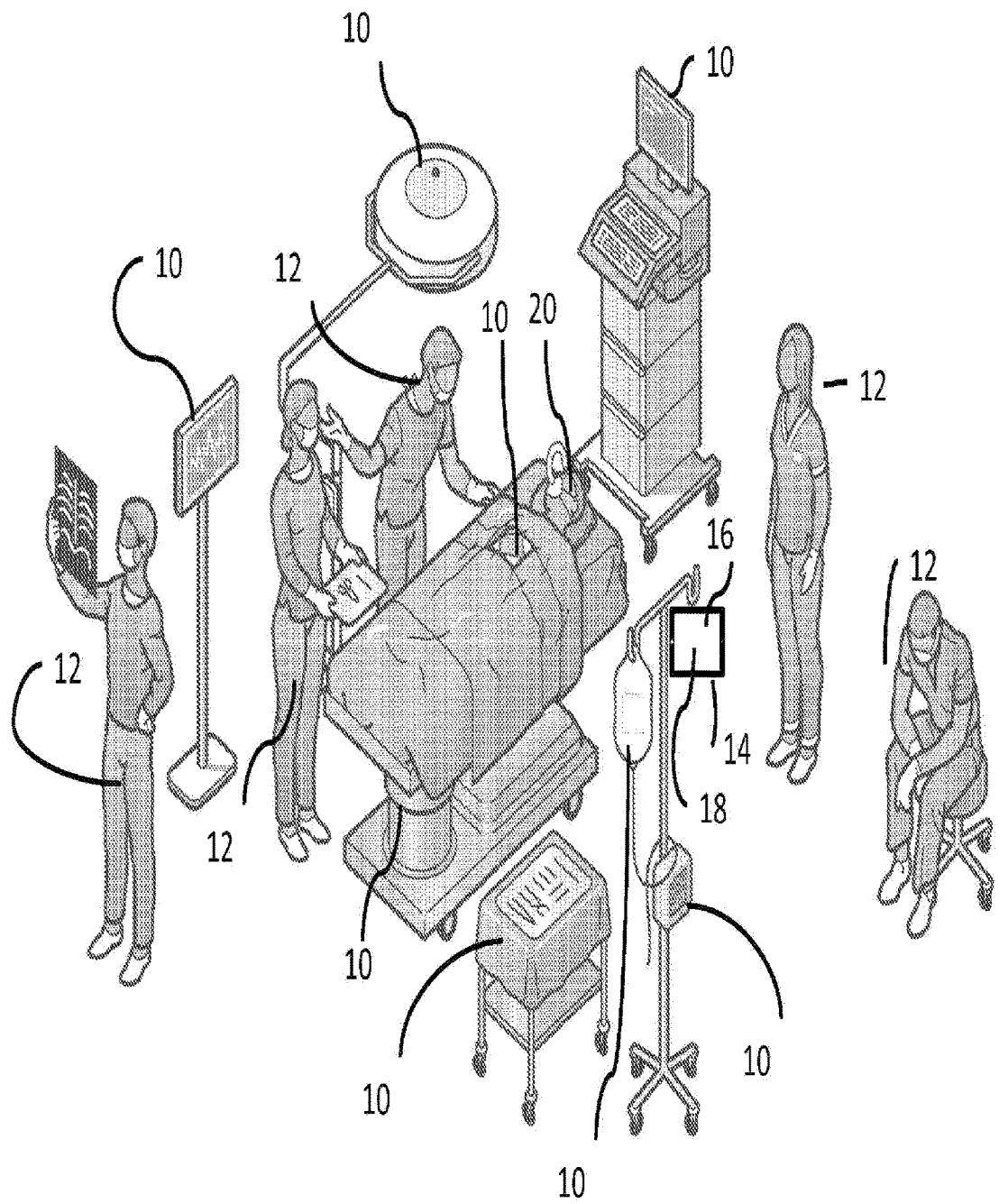
FIG. 3 is a schematic view of an operating room environment useful to illustrate use of application of the system of FIG. 1.

FIG. 3 is a schematic of an operating room with various medical equipment 10 that can be utilized in one embodiment of the methods, program products and systems of the inventive subject matter. The operating room can include one or more medical-related equipment 10 and healthcare professionals 12. Medical-related equipment 10 can consist of any FDA-approved type 1 through 3 medical devices. Healthcare professional 12 can consist of any role in healthcare. A patient 20 may also be present. The electronic device used can be in the form of a computer or mobile device 14, for example any of the electronic devices described above, that can be in a sterile container 16 within a software application 18. The electronic device may be anywhere within the defined location, as depicted it is connected to an Intravenous (IV) operating room holder. The system, method and device of the present inventive subject matter may be utilized in similar or other locations and applications, which may not be an operating room as depicted or described herein.

In one embodiment of the inventive subject matter, the method or software algorithms are stored on one or more servers, for example one or both of servers in FIG. 1, on the one or more electronic devices, for example one or both of the electronic devices in FIG. 1, or any combination of the foregoing. In one embodiment of the inventive subject matter, the communication method or software algorithm causes or enables one user or requestor to be connected to another user or recipient based on a variety of parameters over the Internet. Once connected, requestor and recipient could collaborate with each other by means of secure communications that could be in the form of video, audio and/or data.

The first user or requestor may initiate the request over a mobile or other electronic device for a variety of purposes, and the requestor is connected to the second user or recipient based on a multitude of parameters. There may be an unlimited number of parameters and parameters can be anything that can decrease the time to connect the requestor to best recipient in the most efficient manner. Parameters can include, but are not limited to network connection, availability and location. The parameters can be ordered in any way but may be ordered by network connection, then availability and finally location.

Figure 4:
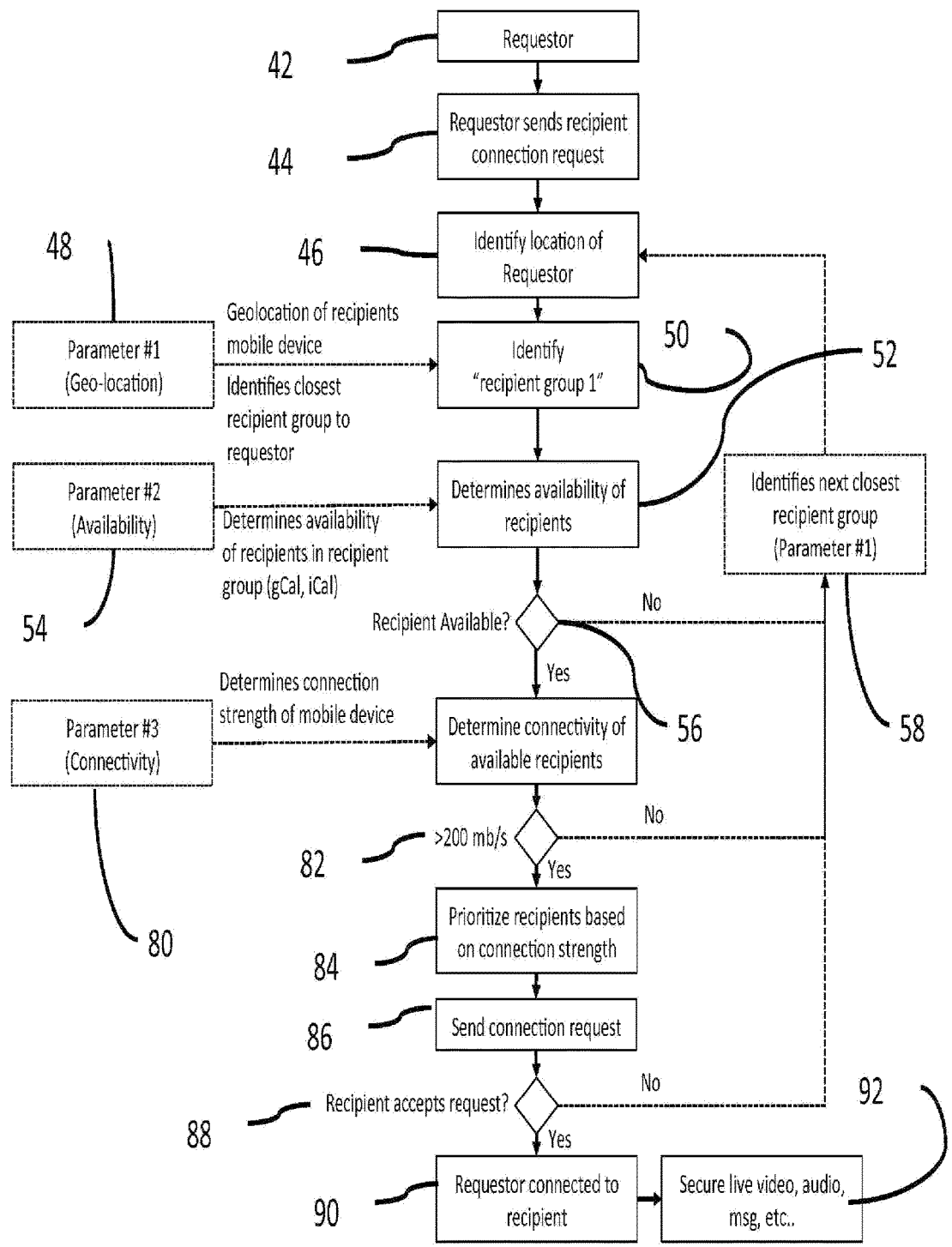
FIG. 4 is a flowchart describing the steps involved in determining the requestor location and network connections.

In one embodiment, the requestor 42 location and network connection 44 is determined as described in FIG. 4. The requestor may be within a healthcare specific environment such as a hospital or ambulatory care surgery center. Within the healthcare environment, the requestor may be in any patient care area such as an operating room, procedure room, catheter lab, and device clinic or radiology lab. The requestor could have any role within the healthcare space, such as a physician, nurse, or operating room staff. The requestor may seek support for another individual or recipient. The support requested could be for a number of reasons including but not limited to; pre-operative, peri-operative, post-operative, medical equipment installation or repair, clinical information, training, education, patient follow-up or any other type of assistance in a healthcare environment.

The requestor may connect with recipient by initiating a connection request 46 to a plurality of recipients. The recipients may have any type of role, such as another healthcare professional or medical device representative. The requestor can be connected with a recipient over the Internet using a number of parameters. The initial parameter may be network connection of the mobile devices for recipients 48.

Upon initiation of requestor sending connection request to a plurality of recipients, the network connection is determined for all recipients 50. The network connection may be determined by assessing the upload strength, download strength, socketserver ports and firewall ports of the network in which the recipients are connected. The network connection may be determined through a number of methods including but not limited to sending packets through the WebRTC data stream to determine the network connection.

Upon completion of the network connection assessment for all recipients, a result can be provided back for each. Recipients can be grouped into two categories, those recipients marked available 56 and those marked unavailable 58. The parameter that groups recipients can be any particular parameter. In one embodiment, the parameter is availability 54. The recipients that are considered available can be determined based on the network connection. In one embodiment, the recipient whose network connection is greater than 1 megabit per second upload and download speed are marked available 56. The recipients whose network connection is less than 1 megabit per second upload and download speed are marked unavailable. The network connection can be any particular upload and download speed. The network connection parameter may also include other network assessments including the quality of the network, websocket server availability and firewall port availability to provide an overall network score to segment recipients into available and unavailable Once recipients have been grouped based on the first two initial parameters, a third parameter may determine the priority of sending the connection requests. In one embodiment, this parameter may be the location 80 of the available recipients 82. In order to determine the location of available recipients 84, the geo location of the recipient's mobile devices may be determined through latitude and longitude coordinates through the location services of the mobile device. Any other mean of determining location may be utilized.

After determining the location of available recipients, the connection request may be prioritized based on proximity of available recipients to the requestor 86. This prioritization may be done by analyzing the geo location or latitude/ longitude coordinates of the mobile devices for each available recipient and comparing it to the geo location or latitude/longitude of the requestor. It is worth mentioning that prioritization may also occur based on past interactions between the requestor and available recipients. Those available recipients who are closest to the requestor can be prioritized first, with those furthest away being prioritized last.

After the available recipients are prioritized based on proximity to the requestor, the connection request is sent to each available recipient 94, starting with the recipient closest to the requestor. The requestor connection request can be sent to the recipient in the form of a notification, audio or vibration on their mobile device. The recipient may choose to accept, decline or ignore the connection request 88. If the recipient declines or ignores the connection request, the closest next available recipient may receive the requestor connection request 86. If the available recipient accepts the connection request, the requestor and recipient are connected over the Internet. As mentioned, the requestor and recipient may be connected over any device that connects to the Internet, but may be a mobile device.

Once the requestor and recipient are connected over the Internet, a number of actions may occur. In one embodiment, the requestor and recipient are connected over secure communications 92. These secure communications may come in the form of two-way video, audio and data. The communications may be encrypted by any means, but could be in the form of 128-bit advanced encryption standard (AES). The communications may be in any form and may be transmitted through standard communication protocols including WebRTC. The communications may not require any servers or plugins and may communicate in a peer-to-peer fashion eliminating the need for servers to interface the communications. If requestor and/or recipient is behind a network address translation (NAT), said embodiment may use signaling algorithms to connect the requestor and recipient by using algorithms such as interactive connectivity establishment (ICE), session traversal utilities for NAT (STUN) or traversal using relays around NAT (TURN). Other algorithms may be used to ensure the requestor and recipient is connected in the most efficient manner. The connection between the requestor and recipient may be compliant with the Health Insurance Portability and Accountability Act (HIPAA) and other federal regulations that require secure encrypted communications to protect patient health information (PHI).

In addition, in describing a particular embodiment of the present inventive subject matter, be it a method, system or program product, descriptions of other embodiments may also be made. For example, it will be understood that when describing a method of the inventive subject matter, a system and/or a program product of the system may likewise be described, and vice-versa. The said embodiment may be used for any applicable purpose in which one user needs to connect to another user in the most efficient manner based on a plurality of parameters over the Internet.

A method, system and algorithm for connecting two users of mobile or other electronic devices in the most efficient manner using specific parameters is disclosed. The requestor can have a specific need to connect with a remote recipient or recipient in a large user group as in the most efficient manner over an Internet or other connection. The method, system and algorithm can be customized based on any requirements and can be defined for use across a number of applications.

We claim:

1. A method for initiating and establishing a connection for an encrypted session over a wireless network between an electronic device of a Network Address Translation (NAT) enabled requestor and an electronic device of one of a plurality of NAT enabled recipients, comprising:
evaluating the plurality of recipients based on a first parameter to form a group of recipients;
evaluating the group of recipients on a second parameter to form a group of eligible recipients;
prioritizing eligible recipients using a third parameter to form a group of prioritized eligible recipients;
determining a sequential priority order based on the third parameter for sending connection requests to the group of prioritized eligible recipients;
sending of connection request between the electronic device of the requestor and the electronic device of prioritized eligible recipients according to the sequential priority order for the group of prioritized eligible recipients;
using signaling algorithms to connect the requestor and the prioritized eligible recipients by using algorithms from a group comprising interactive connectivity establishment (ICE), session traversal utilities for NAT (STUN) or traversal using relays around NAT (TURN);
continuing the sending of connection request between the electronic device of the requestor and the electronic device of next available prioritized eligible recipients according to the sequential order, when a prioritized eligible recipient is unavailable to accept the connection request, until an available prioritized eligible recipient accepts the connection request; and
establishing a connection for the encrypted session over a wireless network between the electronic device of the requestor and the electronic device of the available prioritized eligible recipient.

2. The method of claim 1, wherein the requestor location is determined by determining the latitude and longitude coordinates of the requestor's electronic device.

3. The method of claim 1, wherein a first parameter forms the group of recipients that can be then formed into a group of eligible recipients based on a second parameter and then prioritized based on a third parameter.

4. The method of claim 1, wherein the parameters are selected from a group of parameters consisting of the network connection of recipients, availability of recipients as determined based on the network connection of recipients electronic devices, location of the plurality of available recipients relative to the requestor.

5. The method of claim 3, wherein the first parameter is network connection of recipients, second parameter is availability of recipients and third parameter is the location of the plurality of available recipients.

6. The method of claim 4, wherein the evaluating all recipients network connection of their electronic devices and grouping recipients as available if their electronic device has a network connection greater or equal to one megabit per second upload and download speed.

7. The method of claim 4, wherein recipients are marked unavailable when network connection of their electronic devices is less than one megabit per second upload and download speed.

8. The method of claim 4, wherein the network connection parameter to group recipients as available or unavailable can be any defined upload and download speed and can include a number of other network assessments to provide an overall network score.

9. The method of claim 3, wherein the second parameter is availability of recipients based on the outcomes of the first parameter, network connection of the recipients electronic devices.

10. The method of claim 3, wherein the third parameter is the location of available recipients.

11. The method of claim 10 in which the available recipients location is determined by assessing the latitude and longitude coordinates of the available recipients electronic devices.

12. The method of claim 10, wherein the latitude and longitude coordinates of available recipients electronic devices is determined through location services of the recipient's electronic device.

13. The method of claim 9, wherein the available recipients are prioritized based on proximity to the requestor.

14. The method of claim 13, wherein the distance between each available recipient and requestor are determined by comparing latitude and longitude coordinates of the requestor and recipient's electronic devices.

15. The method of claim 1, wherein once the requestor and recipient are connected, communications may occur between the requestor and recipient over their electronic devices, wherein the connection may be web real-time communications requiring no plugins or servers and connecting the requestor and recipient in a peer-to-peer fashion complying with the Health Insurance Portability and Accountability Act.

16. The method of claim 1, wherein each electronic device is a hand-held wireless mobile device or wired device.

* * * * *